United States Patent [19]

Jardin et al.

[11] 4,312,534
[45] Jan. 26, 1982

[54] RIGID COVER FOR VEHICLE ROOFS

[75] Inventors: Hans Jardin, Inning; Walter Schätzler, Gauting, both of Fed. Rep. of Germany

[73] Assignee: Webasto-Werk W. Baier GmbH and Co., Munich, Fed. Rep. of Germany

[21] Appl. No.: 144,277

[22] Filed: Apr. 28, 1980

[30] Foreign Application Priority Data

Apr. 28, 1979 [DE] Fed. Rep. of Germany ... 7912486[U]

[51] Int. Cl.³ .................................................. B60J 7/00
[52] U.S. Cl. ..................................... 296/216; 296/222; 49/488
[58] Field of Search .......................... 296/222, 93, 216; 49/488, 493, 490

[56] References Cited

U.S. PATENT DOCUMENTS

| | | | |
|---|---|---|---|
| 3,241,281 | 3/1966 | Hall | 296/93 |
| 3,905,640 | 9/1975 | Lutz | 296/222 |
| 3,964,784 | 6/1976 | Prechter et al. | 296/216 |
| 4,018,476 | 4/1977 | Lutz et al. | 296/222 |
| 4,229,037 | 10/1980 | Vermeulen | 296/222 |
| 4,232,081 | 11/1980 | Pullan | 49/490 |

*Primary Examiner*—Robert R. Song
*Attorney, Agent, or Firm*—Craig and Antonelli

[57] ABSTRACT

A rigid cover assembly for vehicle roofs having an opening that can be opened or closed by displacement of a rigid cover panel is provided with a mounting arrangement for the cover panel that is simple to install, provides a good sealing action, and permits considerable dimensional tolerances for the cover panel, even when made of glass or the like. In accordance with preferred embodiments, a peripheral mounting frame is placed in abutment with the bottom edge surface area of the cover panel. This mounting frame is bent downward and outward and then extends upward at its outer edge area so as to have an essentially U- or V-shaped section upon which a sealing section is pushed on from above. The sealing section has a flange which peripherally overlies the top surface of the cover panel.

12 Claims, 3 Drawing Figures

RIGID COVER FOR VEHICLE ROOFS

BACKGROUND AND SUMMARY OF THE INVENTION

The invention relates to a rigid cover for vehicle roofs, said cover closing a roof opening in its closed position, said cover further being optionally lowerable out of this roof opening and being slidable beneath the fixed rear roof part and/or tiltable at its rear edge above the fixed rear roof part, with a cover panel of glass or a similar material, a mounting frame resting on the underside of the cover and extending along at least one part of the circumference of the cover, and a section running around at least a part of the circumference of the cover panel.

In a known arrangement of this type, designed as a sliding cover (U.S. Pat. No. 3,964,784), the cover panel is surrounded by a divided section of soft aluminum or the like. In this patent, the edge of the cover panel penetrates essentially horizontally into an appropriately dimensioned groove in the section, said section being pushed on laterally from outside and glued to the cover panel. The soft aluminum section is provided with a downwardly projecting leg, said leg being screwed to a bent leg of the mounting frame. Despite this division, the aluminum section can only be installed with difficulty and great care. The known design requires close tolerances. At the same time, the resultant seal is unsatisfactory.

An object of the present invention is to provide a translucent cover for vehicle roofs, said cover being especially simple to install, providing a good sealing action, and permitting considerable dimensional tolerances for the cover panel made of glass or the like.

This object is achieved according to a preferred embodiment of the invention by virtue of the fact that the mounting frame comprises a flange projecting outwardly above the circumference of the cover panel, said flange being bent upward, onto which flange the section is forced from above. Mounting the sealing section on the bent flange of the mounting frame poses no problems and requires no special arrangements. The section is capable of compensating for even large dimensional tolerances in the cover panel. The upwardly-bent flange of the mounting frame, on the other hand, provides an exact dimension for the cover in the sealing area. Pushing the section on from above effectively prevents inadvertent separation.

Preferably, an effort is made to ensure that the mounting frame together with the upwardly-bent flange and the section fit around the cover panel on all sides. The cover panel, made of glass in particular, is thereby held and protected reliably. The section can be made in the form of an endless ring in the arrangement according to a preferred embodiment of the invention.

In order to allow for even large dimensional tolerances in the cover panel, the sealing section is provided advantageously in its upper part with a wide, inwardly-projecting lip, which rests upon the top of the edge of the cover panel.

The section can advantageously consist of sealing material or can form a rigid upper mounting frame. It is advantageous to arrange a sealing section in such a manner that it can be applied in a sealing fashion to the edge of the roof opening or to provide it in the form of a sealing section that fits around this edge.

Advantageously, the mounting frame abutting the underside of the cover panel is bent downward, at or a short distance in front of, the outer edge of the cover panel, in order then to make a transition to the upwardly-bent flange, forming an essentially U- or V-shaped section. This not only produces a considerable stiffening of the mounting frame, but also makes it possible to provide a seal whose height is greater than the thickness of the cover panel.

The mounting frame is advantageously provided with one or more weep holes in the vicinity of the lower end of the upwardly-bent flange.

These openings permit any water which penetrates, or water of condensation, to run off in the usual fashion into a gutter located beneath the edge of the roof opening.

In order to further improve the sealing action, at least one elastic sealing bead or similar material can be installed between the mounting frame and the underside of the cover panel.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
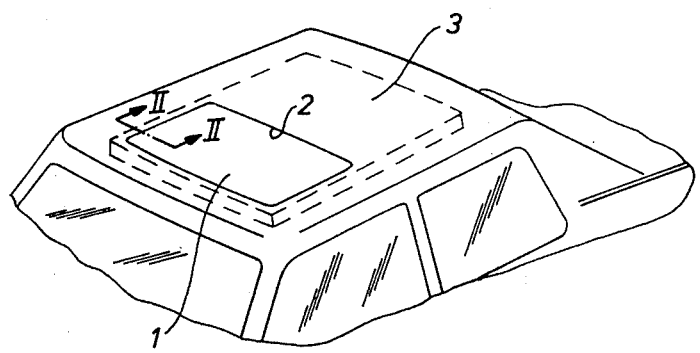
FIG. 1 is a schematic perspective view of a vehicle roof with a sliding cover.

According to FIG. 1, a rigid, translucent cover 1 is provided, said cover closing a roof opening 2 in the position shown. Cover 1 can be lowered in known fashion from the closed position and slid beneath the fixed rear roof part 3. The cover design according to the invention is also suitable for covers which are tiltable at the rear edge above the fixed rear roof part 3, and for arrangements wherein the cover can be optionally slid or tilted.

Figure 2:
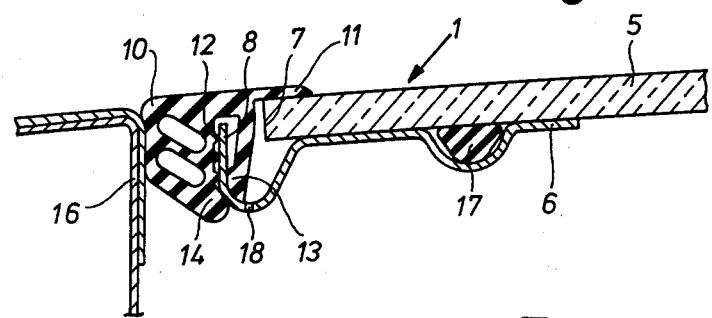
FIG. 2 is a section along line II—II in FIG. 1.

As shown in FIG. 2, cover 1 comprises an essentially flat cover panel 5 made of glass or a similar material. A mounting frame 6 abuts the lower edge of cover panel 5, said frame extending around the outer edge of cover panel 5 and being firmly linked to the cover panel in any appropriate fashion. The mounting frame is bent downward a short distance from outer edge 7 of cover panel 5, and makes a transition to an upwardly-bent, essentially vertical flange 8, forming an essentially U- or V-shaped section. An essentially U-shaped sealing section 10 is pushed on from above onto flange 8. The sealing section is provided in its upper part with a broad, inwardly-projecting lip 11, said lip resting upon the top of edge 7 of cover panel 5. Sealing section 10 is provided internally with lips 12 and 13, said lips pressing on both sides of flange 8. The outer leg 14 of sealing section 10 can be pulled downward until it contacts the diagonal lower part of flange 8, in order to provide additional protection against sealing section 10 being pulled off upward.

With cover 1 in the closed position, leg 14 of sealing section 10 rests in a sealing fashion in the manner indicated in FIG. 2 against the fixed frame 16 of roof opening 2. An elastic sealing bead 17 or similar sealing material is located between the underside of cover panel 5 and the horizontal part of mounting frame 6, to provide additional sealing protection. Condensation water or water which may penetrate between lip 11 of sealing section 10 and the top of cover panel 5 can run off through weep holes 18 in the vicinity of the lower end of flange 8. The water then enters a gutter, not shown, which runs in known fashion around roof opening 2.

Flange 8 of mounting frame 6 provides an exact cover dimension in the sealing area making it unimportant for cover panel 5 to have exact dimensions. The horizontal part of mounting frame 6 and sealing section 10, as well as the lip of the latter, also allow for major dimensional variations in cover panel 5, without losing the sealing action.

Figure 3:
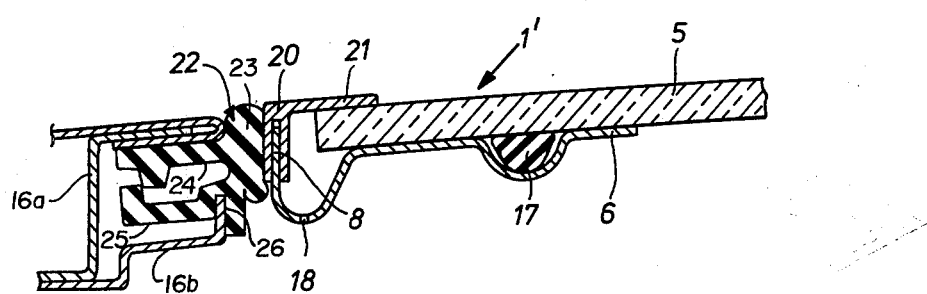
FIG. 3 is a section similar to FIG. 2 for a modified embodiment.

According to the modified embodiment shown in FIG. 3, a sealing section 20 is pushed onto the upwardly-bent flange 8 of the lower mounting frame 6, said section 20 forming an upper mounting frame and being provided with a broad inwardly-projecting lip 21, said lip abutting the top of cover panel 5. Section 20 can be glued to flange 8. With cover 1 in the closed position, section 20 presses against a seal 22 permanently mounted on the inside of roof opening 2.

The seal 22 has a sealing section 23 which abuts and is elastically compressed against section 20 when the cover panel 5 is in its closed position shown. The seal 22 is provided with two legs 24, 25 that extend from sealing section 23. These legs are springily deflectable toward each other for the purpose of enabling their insertion between fixed roof frame portions 16a, 16b, where they are retained in use. To aid in preventing undesired dislodgement of seal 22, leg 25 is constructed with a slot-like formation 26 which is mounted upon fixed frame portion 16b.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Rigid cover assembly for vehicle roofs, said cover opening and closing a roof opening in its opened and closed positions, respectively, comprising a cover panel, and a mounting frame abutting against the underside of the cover panel and extending along at least a part of the circumference of the cover panel, said mounting frame having a sealing section fitting around at least a part of the circumference of the cover panel, characterized by the fact that the mounting frame comprises a flange which is bent upward and projects outward beyond the circumference of the cover panel and onto which flange said sealing section is pushed on from above.

2. Cover assembly according to claim 1, characterized by the fact that the mounting frame, with said upwardly-bent flange and said sealing section, fits around all sides of the cover panel.

3. Cover assembly according to claims 1 or 2, characterized by the fact that said sealing section comprises a broad inwardly-projecting lip on an upper part thereof, said lip abutting upon a top surface of an edge of the cover panel.

4. Cover assembly according to claim 3, characterized by the fact that said sealing section is made of elastically resilient material.

5. Cover assembly according to claim 3, characterized by the fact that said sealing section forms a rigid upper mounting frame.

6. Cover assembly according to claim 4, characterized by the fact that said sealing section, when said cover is in said closed position, abuts in a sealing fashion against an edge of the roof opening.

7. Cover assembly according to claim 5, characterized by the fact that said sealing section, when said cover is in said closed position, abuts in a sealing fashion against a seal surrounding an edge of the roof opening.

8. Cover assembly according to claim 3, characterized by the fact that the cover panel is essentially flat.

9. Cover assembly according to claim 1, characterized by the fact that the mounting frame which abuts the underside of the cover panel is bent downward at or a short distance from the outer edge of the cover panel, and then makes a transition to the upwardly-bent flange, forming an essentially U- or V-shaped section.

10. Cover assembly according to claims 1 or 9, characterized by the fact that the mounting frame is provided with at least one weep hole in the vicinity of a lower end of the upwardly-bent flange.

11. Cover assembly according to claims 1 or 9, characterized by the fact that at least one elastic sealing bead is inserted between the mounting frame and the underside of the cover panel.

12. Cover assembly according to claims 1 or 9, wherein said cover panel is formed of glass or a similar material which permits light to pass therethrough.

* * * * *